US007996050B2

(12) United States Patent
Won et al.

(10) Patent No.: US 7,996,050 B2

(45) Date of Patent: Aug. 9, 2011

(54) INPUT DEVICE FOR AN ELECTRONIC DEVICE AND ELECTRONIC DEVICE HAVING THE SAME

(75) Inventors: Chang-Bai Won, Suwon (KR); Jin-Hyung Cho, Changwon (KR); June-Wook Jeong, Incheon (KR)

(73) Assignee: LG Electronics Inc., Seoul (KR)

( * ) Notice: Subject to any disclaimer, the term of this patent is extended or adjusted under 35 U.S.C. 154(b) by 608 days.

(21) Appl. No.: 11/711,662

(22) Filed: Feb. 28, 2007

(65) Prior Publication Data

US 2007/0210828 A1 Sep. 13, 2007

Related U.S. Application Data

(60) Provisional application No. 60/879,013, filed on Jan. 8, 2007.

(30) Foreign Application Priority Data

Feb. 28, 2006 (KR) ........................ 10-2006-0019644
Mar. 31, 2006 (KR) ........................ 10-2006-0029923

(51) Int. Cl.
*H04M 1/00* (2006.01)

(52) U.S. Cl. ..................... 455/575.1; 455/566; 379/419; 379/420; 379/422; 379/433

(58) Field of Classification Search ............... 455/575.1, 455/566; 379/419, 420, 422, 433
See application file for complete search history.

(56) References Cited

U.S. PATENT DOCUMENTS

| | | | | |
|---|---|---|---|---|
| 4,590,338 | A * | 5/1986 | Suzuki | 200/5 R |
| 4,963,876 | A | 10/1990 | Sanders et al. | |
| 5,412,165 | A * | 5/1995 | Malone et al. | 200/5 R |
| 5,436,954 | A * | 7/1995 | Nishiyama et al. | 455/566 |
| 5,689,095 | A * | 11/1997 | Kawase | 200/5 R |
| 6,097,964 | A | 8/2000 | Nuovo et al. | |
| 6,211,474 | B1 | 4/2001 | Takahashi | |
| 6,218,635 | B1 | 4/2001 | Shigemoto et al. | |
| 6,291,782 | B1 * | 9/2001 | Isikawa | 200/14 |
| 6,333,473 | B1 * | 12/2001 | Sawada et al. | 200/4 |
| 6,340,801 | B1 | 1/2002 | Fukuda et al. | |
| 6,370,362 | B1 | 4/2002 | Hansen et al. | |
| 6,388,212 | B1 | 5/2002 | Ishihara et al. | |
| 6,397,084 | B1 | 5/2002 | Wicks et al. | |
| 6,571,086 | B1 | 5/2003 | Uusimaki | |
| 6,628,970 | B2 | 9/2003 | Nishiyama et al. | |
| 6,759,933 | B2 * | 7/2004 | Fallak | 335/207 |
| 6,774,322 | B2 * | 8/2004 | Morinishi et al. | 200/5 R |
| 6,782,242 | B1 | 8/2004 | Koleda et al. | |
| 6,810,272 | B2 | 10/2004 | Kraft et al. | |

(Continued)

FOREIGN PATENT DOCUMENTS

CN 1497928 A 5/2004

(Continued)

*Primary Examiner* — Edward Urban
*Assistant Examiner* — Ganiyu Hanidu
(74) *Attorney, Agent, or Firm* — Birch, Stewart, Kolasch & Birch, LLP

(57) ABSTRACT

An input device for an electronic device is provided that includes a base, a frame pivotally connected to the base, a roller member rotatably supported by the frame, and at least one button pivotally connected at a side of the base. An electronic device is also provided that includes a first body, a second body pivotally attached to the first body, and an input device located in the first body.

14 Claims, 6 Drawing Sheets

U.S. PATENT DOCUMENTS

| | | | |
|---|---|---|---|
| 6,813,509 | B2 | 11/2004 | Aquilar et al. |
| 6,862,459 | B2 | 3/2005 | Sawada et al. |
| 6,865,404 | B1 | 3/2005 | Tikkala et al. |
| 6,965,782 | B1 | 11/2005 | Nuovo et al. |
| 6,967,293 | B1 | 11/2005 | Chen et al. |
| 7,082,323 | B2 | 7/2006 | Yang |
| 7,092,495 | B2 | 8/2006 | Kraft et al. |
| 7,094,980 | B2 | 8/2006 | Ahn |
| D542,285 | S | 5/2007 | O'Neil et al. |
| 7,495,700 | B2 | 2/2009 | Watanabe |
| 7,502,636 | B2 * | 3/2009 | Sakuta et al. .............. 455/575.1 |
| 7,528,331 | B2 | 5/2009 | Bricaud et al. |
| 7,602,377 | B2 | 10/2009 | Kim |
| 2001/0004584 | A1 | 6/2001 | Aquilar et al. |
| 2001/0044317 | A1 | 11/2001 | Prior et al. |
| 2002/0086698 | A1 | 7/2002 | Sawada et al. |
| 2002/0155856 | A1 | 10/2002 | Nishimoto |
| 2002/0155857 | A1 | 10/2002 | Nishimoto |
| 2003/0162540 | A1 | 8/2003 | Nielsen |
| 2004/0198460 | A1 | 10/2004 | Sakuta et al. |
| 2005/0068337 | A1 | 3/2005 | Duarte et al. |
| 2005/0113154 | A1 | 5/2005 | Park et al. |
| 2005/0189203 | A1 | 9/2005 | Kodani et al. |
| 2005/0261019 | A1 | 11/2005 | Lee et al. |
| 2005/0272462 | A1 | 12/2005 | Okamoto |
| 2005/0282597 | A1 | 12/2005 | Park et al. |
| 2006/0038786 | A1 * | 2/2006 | Adan et al. .................... 345/163 |
| 2007/0218943 | A1 | 9/2007 | Takeuchi |
| 2007/0272530 | A1 | 11/2007 | Miyoshi et al. |
| 2009/0137279 | A1 | 5/2009 | Silfverberg |

FOREIGN PATENT DOCUMENTS

| | | | |
|---|---|---|---|
| CN | 2746674 | Y | 12/2005 |
| CN | 2755874 | Y | 2/2006 |
| DE | 197 15 360 | A1 | 10/1998 |
| EP | 1 206 101 | A2 | 5/2002 |
| EP | 1394666 | A1 | 3/2004 |
| JP | 2001-118470 | A | 4/2001 |
| JP | 2005-038429 | A | 2/2005 |
| KR | 20040034420 | A | 4/2004 |
| KR | 1020040034420 | * | 4/2004 |
| KR | 10-2005-0090202 | A | 9/2005 |
| RU | 2 156 513 | C2 | 9/2000 |
| WO | WO 2005/038844 | A1 | 4/2005 |

* cited by examiner

INPUT DEVICE FOR AN ELECTRONIC DEVICE AND ELECTRONIC DEVICE HAVING THE SAME

CROSS REFERENCE TO RELATED APPLICATIONS

This application claims priority to Korean Patent Application No. 10-2006-0029923, filed Mar. 31, 2006, Korean Patent Application No. 10-2006-0019644, filed Feb. 28, 2006, and U.S. Provisional Patent Application No. 60/879,013, filed Jan. 8, 2007, all of which are herein incorporated by reference.

BACKGROUND OF THE INVENTION

1. Field of the Invention

The present invention is generally directed to an input device for an electronic device, and the electronic device having the same. More particularly, the input device includes both a roller member and at least one button adjacent the roller member and an electronic device including the same.

2. Description of Related Art

Many electrical devices include an input device that is configured to control some aspect or function of the electrical device. These electrical devices may be mobile terminals, which in turn can take the form of cellular phones, PDAs (Personal Digital Assistant), and the like, which a user can carry with himself/herself to send/receive various kinds of information, such as images, voices, and text massages via wireless communication or to receive various services via connection to a predetermined server.

Because a mobile terminal performs a wireless communication function in addition to various other functions in correspondence with a user's demand, such as play music, videos, and take pictures, the mobile terminal often includes an input device that is configured to control one or more functions of the mobile terminal and may allow for various forms of input.

For example, U.S. Pat. No. 6,333,473 to Sawada et al discloses an input device that is both rotatable and pressable to provide signals. In particular, the input device can provide five different signals (two signal based on rotation and three signals based on a downward displacement). As described in the patent, the input device includes a frame member 24 and two pressable switches 22A and 22B. The three signals generated by a downward displacement are generated by pressing switch 22A individually, pressing switch 22B individually, and pressing switches 22A and 22B simultaneously. The two rotation signals are based on the rotation direction of a knob 25. As described in the patent, when either switch is pressed independently, most of the pressing force is applied to that switch, however, because of the frame configuration 24, some force is applied to the opposite switch.

As such, that the switches are repeatedly exposed to more force than is necessary. In addition, because it is difficult to press both switches 22A and 22B simultaneously, a separate timing function has to be provided to determine whether a user desired to generate the third signal by pressing both switches 22A and 22B. As a result, additional power is consumed while waiting to detect the pressing of both switches 22A and 22B.

To address this problem, an input device, as shown in FIG. 1, can be provided that generates two rotation signals and a single pressing signal. A rotation member 200 is provided on a body 300. Press switches 400 are provided to either side of the rotation member 200, however due to the size of a user's fingers, the press switches have to provide a minimum spacing 210 to ensure that they are not pressed when the rotation member 200 is utilized.

Because electronic devices, and mobile terminals in particular, are becoming slimmer, spacing of components is very important. As a result, the input device shown in FIG. 1 leaves wasted space.

BRIEF SUMMARY OF THE INVENTION

According to principles of this invention, an input device for an electronic device is provided that includes a base, a frame pivotally connected to the base, a roller member rotatably supported by the frame, and at least one button pivotally connected at a side of the base.

In another aspect, the at least one button includes a pair of buttons and each button is located on the base near opposite ends of the roller member.

In a different aspect, the roller member includes a cylindrical body and a shaft portion. The shaft portion is supported on the frame.

In a further aspect, the input device includes a circuitry supporting substrate located under the base, a rotation sensor module that senses rotation of the roller member, a portion of the rotation sensor module being located on the circuitry supporting substrate, and a plurality of switches located on the circuitry supporting substrate, wherein one of the plurality of switches is located under the frame and another of the plurality of switches is located under the at least one button. The portion of the rotation sensor module located on the circuitry supporting substrate may be a rotation sensor. The rotation sensor module may also include a ring magnet located on the shaft portion of the roller member, and the ring magnet may have a plurality of alternating North and South poles.

In still a further aspect, the input device may include a click magnet located between the ring magnet and the frame. The click magnet is configured to provide slight resistance to the rotation of the roller member.

In another aspect, the input device may include an elastic pad located between the circuitry supporting substrate and the frame.

Also in accordance with principles of the invention, an electronic device is provided that includes a first body, a second body pivotally attached to the first body, and an input device located in the first body. The input device includes a base, a frame pivotally connected to the base, a roller member rotatably supported by the frame, and at least one button pivotally connected at a side of the frame. The electronic device may be a mobile terminal.

In another aspect, the first body may include a keypad and the second body may include a display module. In addition, the circuitry supporting substrate may include a plurality of switches that correspond to the keypad and may control the display module.

In another aspect, the second body may include a recessed portion configured to cover the input device in a closed position without transmitting a force to the input device.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

Reference will now be made in detail to an exemplary embodiment of the present invention, which is illustrated in the accompanying drawings. Hereinafter, an input device and electronic device incorporating the input device according to the present invention will be explained in more detail. In addition, while the present invention is explained by reference to a folding type mobile terminal, it is equally suitable for other mobile terminals including bar type, swivel type, and slide type mobile terminals as well other electronic devices.

Figure 1:
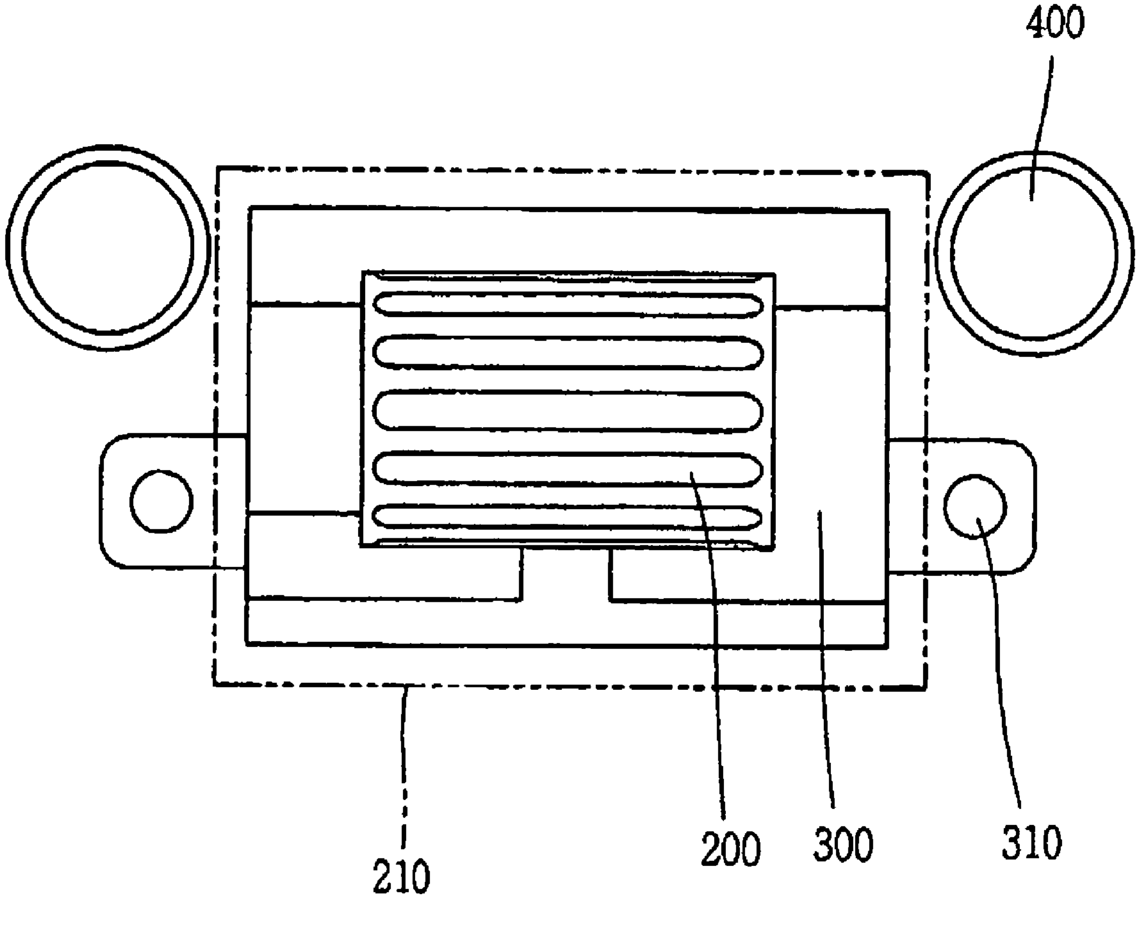
FIG. 1 shows an input device according to the conventional art.
Figure 2:
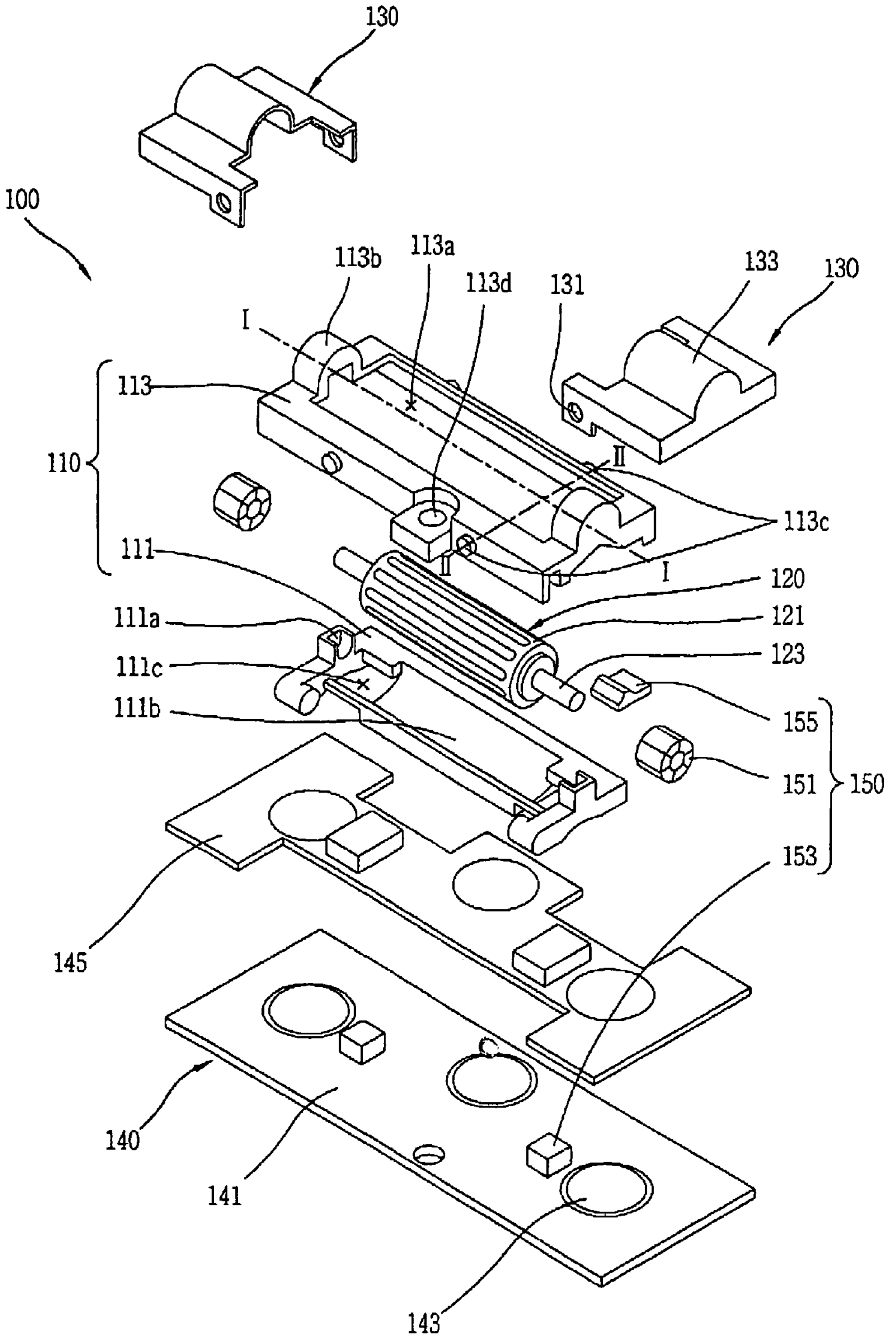
FIG. 2 shows an exploded perspective view of an input device according to an exemplary embodiment of the present invention.
Figure 3A:
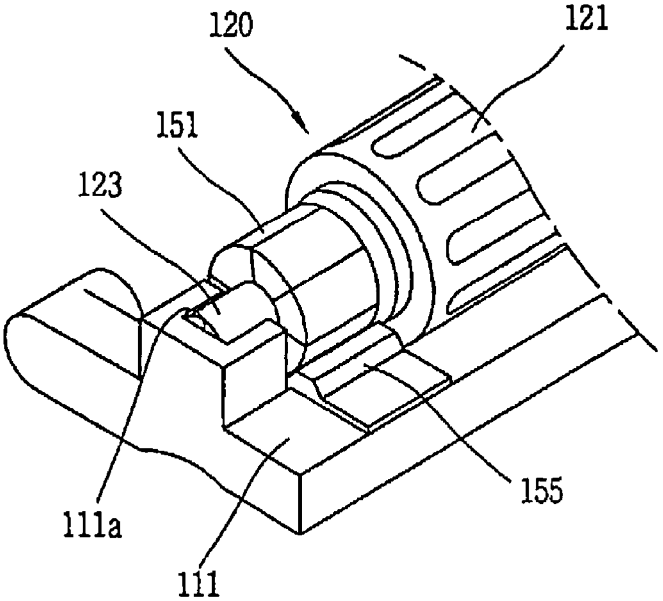
FIG. 3A shows a partial view of the input device of FIG. 2 in an assembled arrangement and FIG. 3B shows a schematic of a magnetic arrangement provided in the input device of FIG. 2.
Figure 3B:
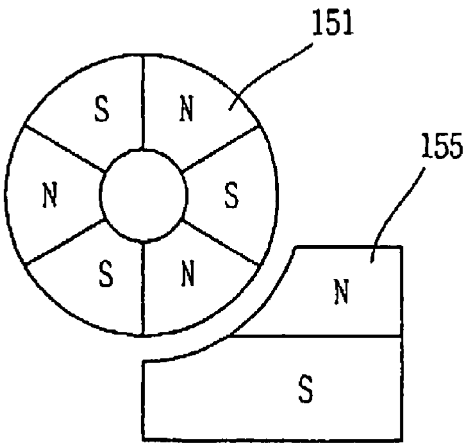
Figure 4:
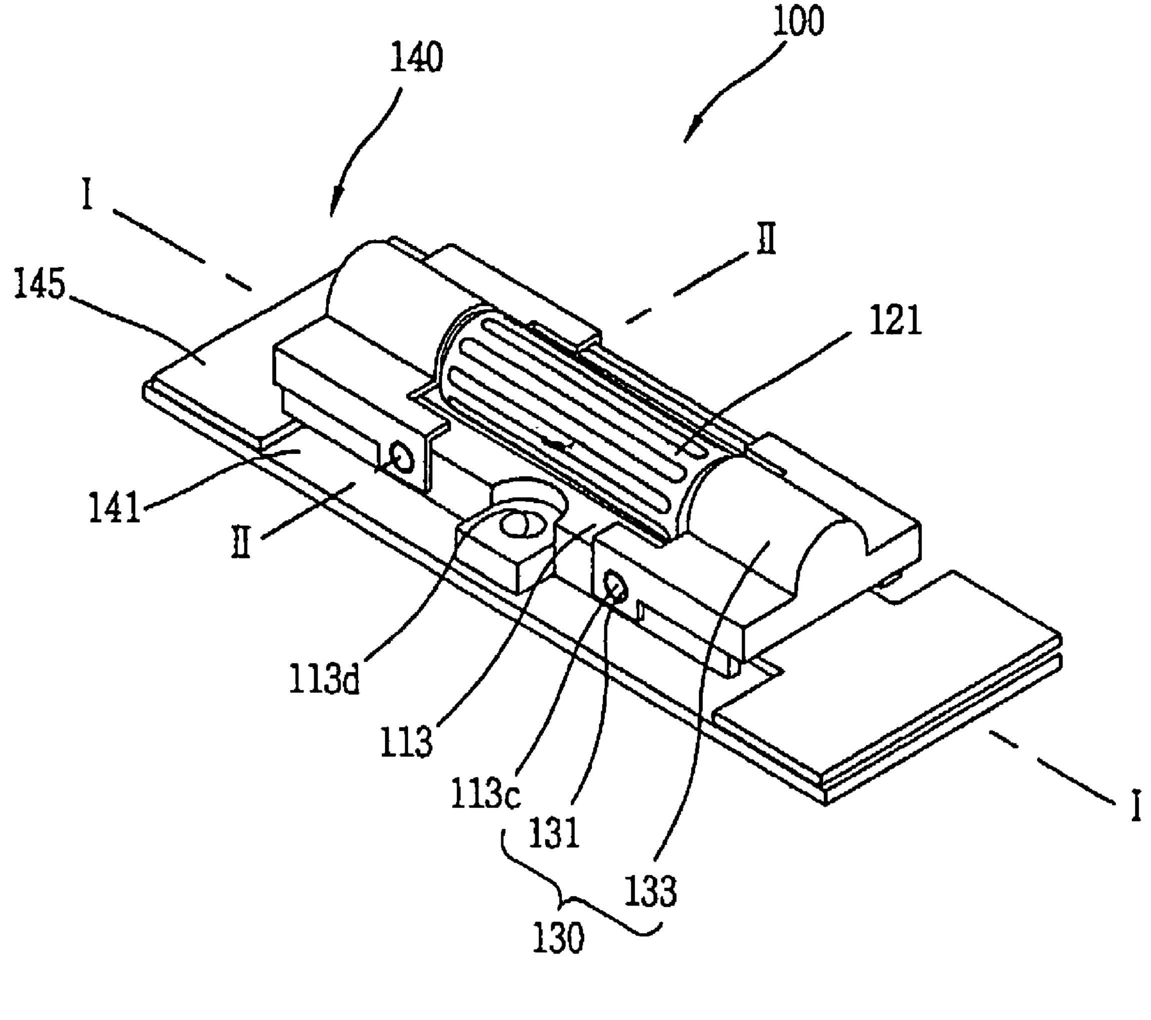
FIG. 4 shows the input device of FIG. 2 in an assembled arrangement.

As seen in FIGS. 2-4, an input device 100 includes a body portion 110 configured to pivotally and rotatably support a roller member 120 and to pivotally support a pair of buttons 130. Preferably an upper surface 133 of each button 130 is shaped to have the same radius of curvature as the roller member to provide a smooth and continuous appearance. It is understood that only a single button may be provided. A signal detection member 140 is located beneath the body 110 and is configured to detect rotational movement and/or a pressing force via a rotation sensor module 150 and a plurality of switches 143, respectively, as will be described in detail below.

The body portion 110 includes a base 113 and a frame 111 pivotally attached to the base 113 such that the frame 111 supports the roller member 120 and allows the roller member 120 to be pressed downward with respect to the base 113. In particular, the roller member 120 includes a cylindrical body 121 and shaft portions 123 that are supported in the frame 111 by support members 111*a*. It is understood that the shaft portions 123 could be a single shaft with the cylindrical body 121 attached to the shaft or each shaft portion could be attached at the ends of or formed integral with the cylindrical body 121. The frame 111 also includes a lower surface 111*b* that is shaped to allow the roller member to rotate in the frame 111. A pair of cutout portions 111*c* is formed in the lower surface 111*b* to avoid interfering with the rotational sensor module 150.

The base 113 defines an open region 113*a* that allows the roller member 120 to partially extend through the base 113 while being supported by the frame 111. Arched portions 113*b* are formed on opposite sides of the base and serve to secure the shaft 123 of the roller member between the base 113 and the frame 111 and defines the location of the rotational axis I-I for the input device 100. A base mounting portion 113*d* is provided on one edge of the frame 113 so that the frame 113 can be mounted to the signal detection member 140. More particularly, the frame 113 is attached to a circuitry supporting substrate 141 of the signal detection member 140. Finally, button supports 113*c* are formed on the base 113 to connect the buttons 130 to the base via connection holes 131 formed in the buttons 130.

The input device 100 generates a signal when the roller member 120 is rotated or pressed downwards towards the signal detection member 140. Specifically, the rotation sensor module 150 detects the forward and reverse rotation of the roller member 120 within the frame 113 and converts that rotation to a signal. One of the switches 143 is arranged beneath the roller member 120 such that a downward displacement of the roller member 120 causes the frame 111 to contact the switch 143. The depressed switch then transmits a signal.

The input device 100 also generates a signal when one of the switches 143 located underneath a corresponding button 130 is depressed. As mentioned above, each of the buttons 130 is pivotally connected to the base 113 via a pair of button supports 113*c*. The button supports 113*c* corresponding to each button 130 define a pivot axis II-II about which the corresponding button 130, 133 pivots.

An elastic pad 145 is located between the frame 111 of the body 110 and the signal detection member 140. The elastic pad may be formed of rubber, silicone, or other elastic material and assists in protecting the signal detection member 140. As shown in FIG. 2, the elastic pad includes a plurality of raised surfaces that correspond to the switches 143 and other elements formed on the circuitry supporting substrate 141.

The circuitry supporting substrate 141 is preferably a thin member. Each of the plurality of switches 143 is preferable a dome switch.

As shown in FIG. 2, the rotation sensor module 150 includes a ring magnet 151 and a sensor 153, such as a Hall IC that is configured to detect rotation of the ring magnet 151. In particular, a ring magnet 151 is located on each of the shaft portions 123. As shown in FIG. 3B, the ring magnet includes a plurality of alternating North and South poles. The Hall IC can detect the rotation of the roller member 120 via the rotation of the ring magnet and can output a signal based on that rotation.

The rotation sensor module 150 can also include a click magnet 155 that provides a clicking feeling to the user. As shown in FIGS. 3A and 3B, the click magnet 155 is supported by the frame 111 and is disposed underneath the ring magnet 151. In the particular embodiment shown, the click magnet has a North pole arranged above the South pole and facing the ring magnet such that the rotation of the roller member alternates the poles of the ring magnet near the click magnet 155. This causes the feeling of clicking for the user as the roller member 120 prefers to be in a state where the poles of the ring magnet 151 complement the poles of the click magnet. As a result, if the roller member is stopped at position where a North pole on the ring magnet is facing a North pole on the click magnet, the roller member is urged to move forward or backward until the poles of the ring magnet 151 complement the poles of the click magnet 155.

In addition to providing a clicking feeling, the click magnet helps retard the rotation of roller member by providing a slight resistance to the rotation of the roller member 120. In other words, the roller member 120 is not free to continue rotating after a rotational force is applied.

The assembled input device 100 is shown in FIG. 4. As noted above, the cylindrical member 121 extends through the base 113, which is attached to the circuitry supporting substrate 141 via the base mounting portion 113*d* and is rotatable about rotation axis I-I. Buttons 130 cover the ends of the base and are pivotable about the pivot axis II-II defined by the button supports 113*c*. Both the circuitry printable substrate 141 and elastic pad 145 are partially visible. It is evident that the input device 100 can readily receive rotational force applied to the cylindrical body 121 and that the cylindrical body can rotate within the base 113. In this manner, a compact input device can be provided where the amount of wasted space between components is minimized.

A pressing or rotational force can be applied to the cylindrical body 121 and to the buttons 130 such that the cylindrical body 121 and buttons 130 engage the signal detection member 140. Each of the signals generated by the switches 143 and the rotation detection module 150 can be used to cause different effects in conjunction with a mobile terminal. For example, the rotational motion of the roller member 120 can be used as a scroll function to scroll up and down, while the pressing motion on the buttons can be used to scroll left and right. There are many different functions that can be associated with the operation of the input device 100.

Figure 5:
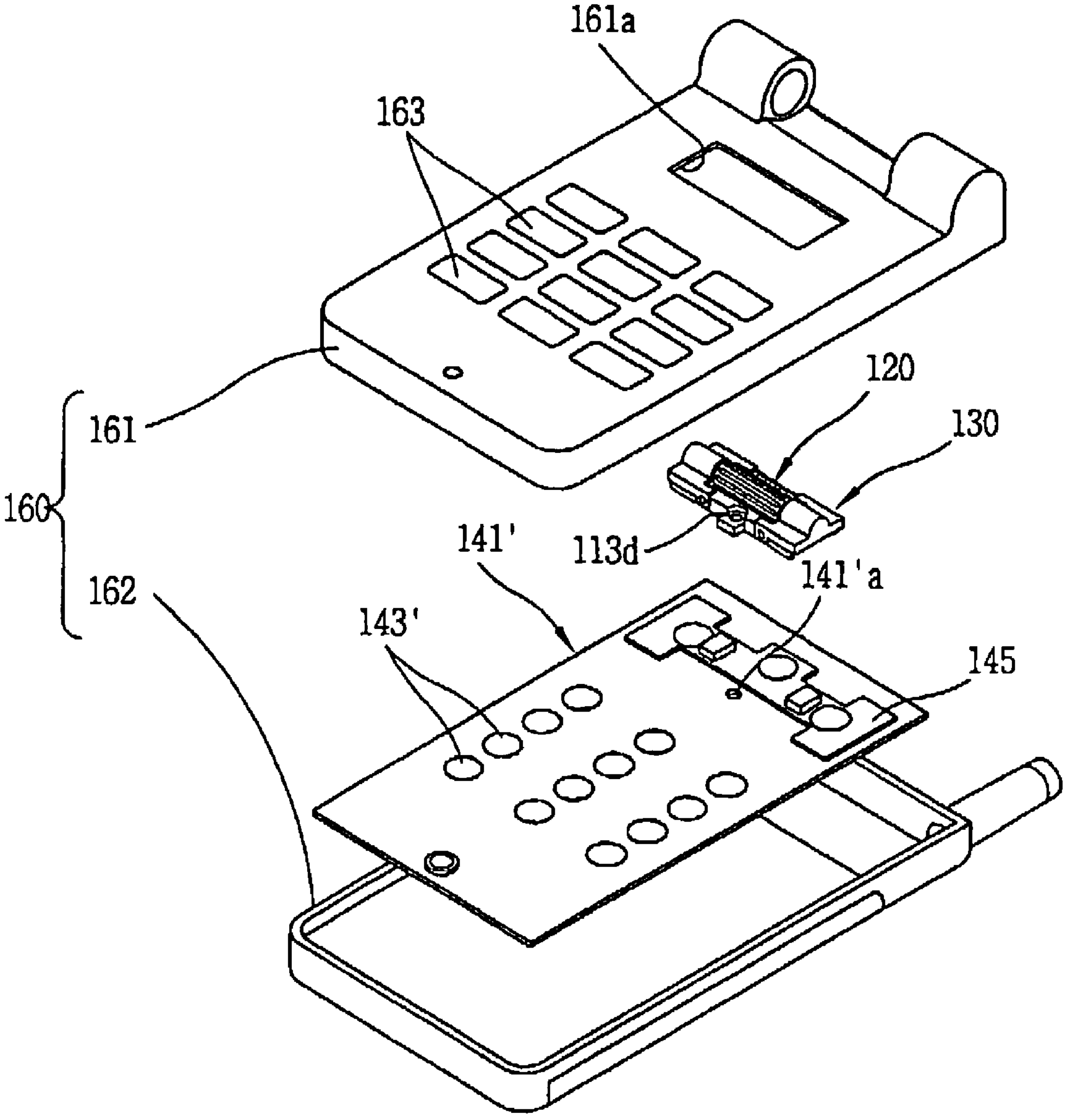
FIG. 5 shows an exploded perspective of a mobile terminal incorporating the input device of FIG. 2.
Figure 6:
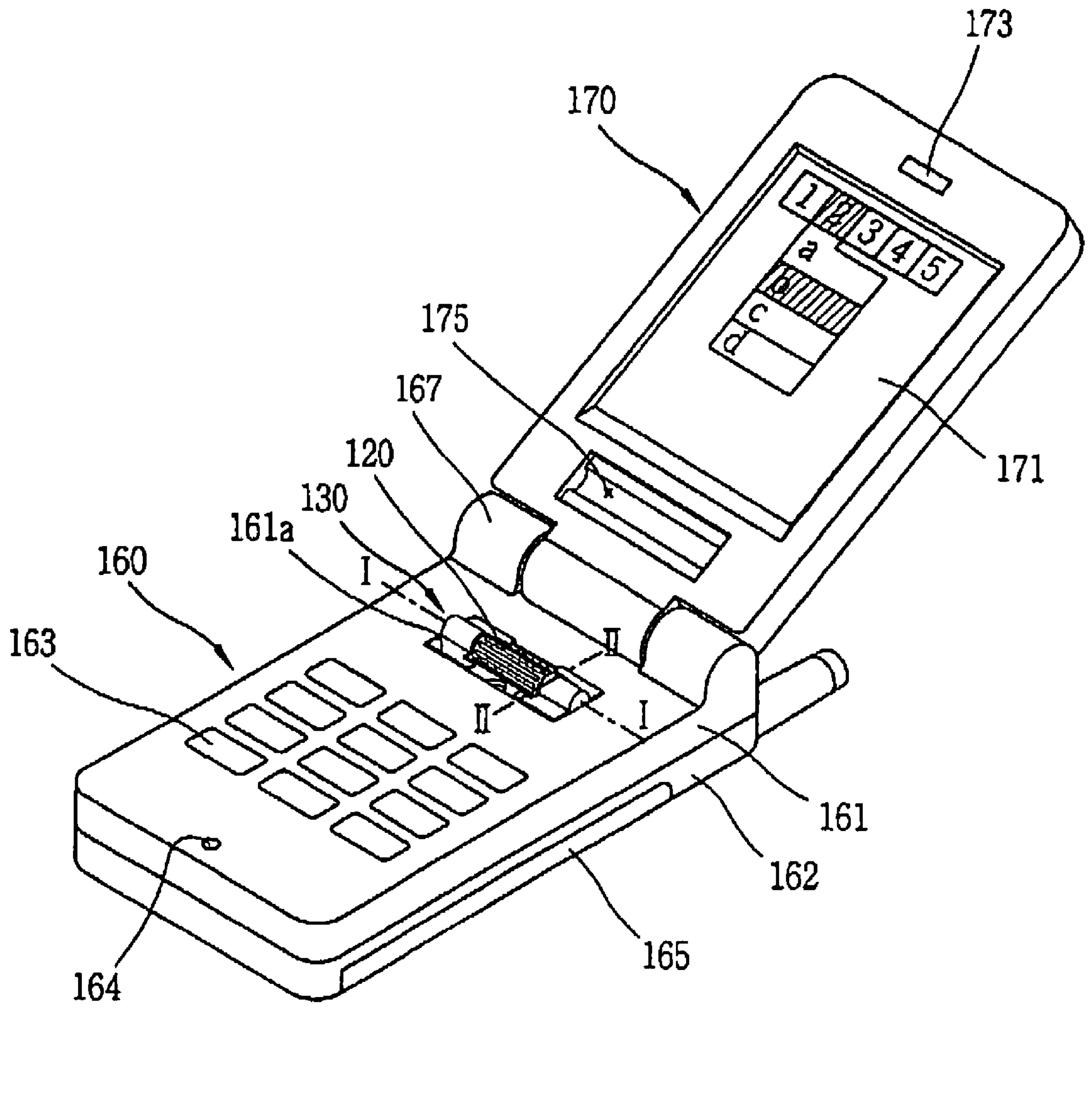
FIG. 6 shows a perspective view of the mobile terminal of FIG. 5 in an assembled arrangement.

A folding type mobile terminal having a first body 160 and a second body 170 pivotally attached to the first body 160 is shown in FIGS. 5 and 6. With particular reference to FIG. 5, an input device similar to the one describe above is incorporated into the first body 160.

The first body 160 includes an upper portion 161 and a lower portion 162. The upper portion 161 includes a keypad 163 and an opening 161*a* through which roller member 120 and buttons 130 can extend. The circuitry supporting substrate 141 has been replaced with a circuitry supporting substrate 141' and additional switches 143' that correspond to keypad 163. The circuitry supporting substrate 141' provides for control of the various components of the mobile terminal as well as providing for the functionality of the input device as described above for circuitry supporting substrate 141. The input device includes the base mounting portion 113*d* and is attached to the circuitry supporting substrate 141' via a mounting hole 141'*a*. The elastic pad 145 is located on the circuitry supporting substrate 141'.

As shown in FIG. 6, the roller member 120 and buttons 130 are exposed through the opening 161*a* in the first body when the second body 170 is in the open position. The first body 161 also allows information to be inputted by the keypad 163. A microphone 164 is also provided in the first portion 161. The upper portion 161 also includes extended portions 167 that cooperate with the second body 170 to provide the pivotability of the second body 170.

The lower portion 162 of the may also contain a battery compartment 165 for energizing the mobile terminal.

The second body 170 includes a display module 171 and a speaker 173. A recessed portion 175 is also formed in the second body 170 and it is arranged to cover the roller member 120 and buttons 130 without applying a pressing force thereto. The display module 171 cooperates with the circuitry supporting substrate 141' to allow a user to control the display via the roller member 120 and buttons 130, as well as the keypad 163. As shown in FIG. 6, menu selection can be performed by moving left and right using buttons 130 to select an item 1 to 5 and scrolling up and down using the roller member 120 within the selected item 2. In addition, the roller member can be used as an enter key by pressing the roller member 120 downwards to select sub-item b. As noted above, there are many different functions that can be assigned to the roller member 120 and buttons 130, and the above examples are not intended to be exhaustive.

Accordingly the present invention provides the following effects and advantages.

First, because the roller member is located on a pivotable frame, which in turn is mounted to the base, and the buttons are mounted on the base a more compact input device can be provided.

Second, because of the versatility of the input device, it can be utilized to operate many different components of a mobile terminal, such as a camera, video player, or other additional components without having separate buttons set up for each function of the various components.

The invention thus being described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An input device for an electronic device, the input device comprising:

a base defining an open region, and having grooves facing each other;

a frame having protrusions and pivotally connected to the base to pivot with respect to the base by connection between the grooves and the protrusions;

a roller member rotatably supported by the frame and partially extending though the open region of the base;

at least one button pivotally connected at a side of the base;

a circuitry supporting substrate disposed below the base and the frame, and having at least one switch operatable by pressing the frame or the roller member; and a rotation sensor module that senses rotation of the roller member, the rotation sensor module including:

a rotation sensor located on the circuitry supporting substrate;

a ring magnet located on a shaft portion of the roller member, the ring magnet having a plurality of alternating North and South poles; and a click magnet located between the ring magnet and the frame, wherein a cutout portion is formed in the frame, and is located between the rotation sensor and the ring magnet, and wherein the click magnet includes a North pole arranged above a South pole so as to provide slight resistance to the rotation of the roller member, and is mounted at a surface of the frame adjacent to the cutout portion.

2. The input device according to claim 1, wherein the at least one button includes a pair of buttons, each button located on the base near opposite ends of the roller member.

3. The input device according to claim 1, wherein the roller member includes a cylindrical body and the shaft portion is supported on the frame.

4. The input device according to claim 3, further comprising:

a plurality of switches located on the circuitry supporting substrate, wherein one of the plurality of switches is located under the frame and another of the plurality of switches is located under the at least one button.

5. The input device according to claim 4, further comprising an elastic pad located between the circuitry supporting substrate and the frame.

6. An electronic device comprising:

a first body;

a second body pivotally attached to the first body; and an input device located in the first body, the input device including:

a base defining an open region, and having grooves facing each other;

a frame having protrusions, and pivotally connected to the base to pivot with respect to the base by connection between the grooves and the protrusions;

a roller member rotatably supported by the frame and partially extending though the open region of the base;

at least one button pivotally connected at a side of the frame;

a circuitry supporting substrate disposed below the base and the frame, and having at least one switch operatable by pressing the frame or the roller member; and a rotation sensor module that senses rotation of the roller member, the rotation sensor module including:

a rotation sensor located on the circuitry supporting substrate;

a ring magnet located on a shaft portion of the roller member, the ring magnet having a plurality of alternating North and South poles; and a click magnet located between the ring magnet and the frame, wherein a cutout portion is formed in the frame, and is located between the rotation sensor and the ring magnet, and wherein the click magnet includes a North pole arranged above a South pole so as to provide slight resistance to the rotation of the roller member, and is mounted at a surface of the frame adjacent to the cutout portion.

7. The electronic device according to claim 6, wherein the at least one button includes a pair of buttons, each button located on the base near opposite ends of the roller member.

8. The electronic device according to claim 7, wherein the roller member includes a cylindrical body and, the shaft portion is supported on the frame.

9. The electronic device according to claim 8, further comprising:

a plurality of switches located on the circuitry supporting substrate, wherein one of the plurality of switches is located under the frame and another of the plurality of switches is located under the at least one button.

10. The electronic device according to claim 9, further comprising an elastic pad located between the circuitry supporting substrate and the frame.

11. The electronic device according to claim 9, wherein the first body includes a keypad and the second body includes a display module.

12. The electronic device according to claim 11, wherein the circuitry supporting substrate includes a plurality of switches that correspond to the keypad and controls the display module.

13. The electronic device according to claim 6, wherein the second body includes a recessed portion configured to cover the input device in a closed position without transmitting a force to the input device.

14. The electronic device according to claim 6, wherein the first body and second body define a mobile terminal.

* * * * *